United States Patent
Häberli et al.

(10) Patent No.: US 6,412,355 B1
(45) Date of Patent: Jul. 2, 2002

(54) CORIOLIS-TYPE FLOW METER AND METHOD FOR MEASURING THE MASS FLOW RATE OF A GASEOUS OR VAPOROUS FLUID

(75) Inventors: Roman Häberli, Halten (CH); Gerhard Eckert, Rheinfelden (DE)

(73) Assignee: Endress + Hauser Flowtec AG, Reinach (CH)

(*) Notice: Subject to any disclaimer, the term of this patent is extended or adjusted under 35 U.S.C. 154(b) by 0 days.

(21) Appl. No.: 09/572,821

(22) Filed: May 16, 2000

Related U.S. Application Data
(60) Provisional application No. 60/158,728, filed on Oct. 11, 1999.

(30) Foreign Application Priority Data
May 20, 1999 (EP) ............................................. 99109896

(51) Int. Cl.[7] .................................................. G01F 1/84
(52) U.S. Cl. ............................. 73/861.356; 73/861.357; 73/861.355
(58) Field of Search ..................... 73/851.357, 861.355, 73/861.356

(56) References Cited
U.S. PATENT DOCUMENTS

| | | | |
|---|---|---|---|
| 4,127,028 A | 11/1978 | Cox et al. | |
| 4,187,721 A | 2/1980 | Smith | |
| 4,793,191 A | 12/1988 | Flecken et al. | |
| 5,347,874 A | 9/1994 | Kalotay et al. | |
| 5,531,126 A | 7/1996 | Drahm | |
| 5,557,973 A | 9/1996 | Koudal et al. | |
| 5,610,342 A | 3/1997 | Wenger et al. | |
| 5,648,616 A | 7/1997 | Keel | |
| 5,675,093 A | 10/1997 | Young et al. | |
| 5,705,754 A | 1/1998 | Keta et al. | |
| 5,736,653 A | 4/1998 | Drahm et al. | |
| 5,831,178 A | * 11/1998 | Yoshimura et al. | .... 73/871.357 |
| 6,006,609 A | 12/1999 | Drahm et al. | |

FOREIGN PATENT DOCUMENTS

| | | |
|---|---|---|
| EP | 0 415 129 | 3/1991 |
| EP | 0 849 568 | 6/1998 |
| EP | 0 866 319 | 9/1998 |

* cited by examiner

Primary Examiner—Benjamin R. Fuller
Assistant Examiner—Corey D. Mack
(74) Attorney, Agent, or Firm—Bose McKinney & Evans LLP

(57) ABSTRACT

The accuracy of this method is comparable to that of the measurement of liquids. The fluid flows through at least one flow tube (4) of a mass flow sensor (1) of a Coriolis mass flow/density meter, which flow tube vibrates at a frequency f being equal to or in the vicinity of the instantaneous mechanical resonance frequency of the flow tube (4) having a vibrator (16). A first and second vibration sensor (17, 18) are attached to the flow tube, deliver a first and a second sensor signal ($x_{17}$, $x_{18}$), and are positioned at a given distance from each other in the direction of flow. The flow tube (4) is surrounded by a support frame or a support tube (15) or held by a support plate so as to be capable of vibrating. The sensor signals ($x_{17}$, $x_{18}$) have a phase difference from which a signal $q_f$ is formed; it is multiplied by a function f(c) dependent on the speed of sound c in the fluid which can be approximated by a function $f(T_m)$ dependent on the current temperature $T_m$ of the flow tube (4).

10 Claims, 2 Drawing Sheets

CORIOLIS-TYPE FLOW METER AND METHOD FOR MEASURING THE MASS FLOW RATE OF A GASEOUS OR VAPOROUS FLUID

This application claim benefit to provisional application No. 60/158,728 Oct. 11, 1999.

FIELD OF THE INVENTION

This invention relates to a method of measuring the mass flow rate of a gaseous or vaporous fluid on the Coriolis principle.

BACKGROUND OF THE INVENTION

This is accomplished by means of Coriolis mass flow/density meters, which, as is well known, have at least one bent or straight flow tube that is vibrated while a fluid flows through it.

Usually, at least one vibrator and at least two vibration sensors are mounted on the flow tube, the vibration sensors being positioned at a given distance from each other in the direction of flow. The flow tube generally vibrates at a mechanical resonance frequency that is predetermined by its material and dimensions but is varied by the density of the fluid. In other cases, the vibration frequency of the flow tube is not exactly the mechanical resonance frequency of the flow tube, but a frequency in the vicinity thereof.

The vibration sensors deliver analog signals whose frequency is equal to the vibration frequency of the flow tube, and which are separated in time, i.e., between which a phase difference exists when the fluid flows through the flow tube. From this phase difference, a signal representing a time difference, e.g. between zero crossings of the sensor signals, can be derived which is directly proportional to mass flow rate, as is described, for example, in U.S. Pat. No. 4,187,721.

It is also possible, however, to derive from the phase difference an angle difference which, after being divided by $2\pi$ times the resonance frequency f of the flow tube, is directly proportional to mass flow rate, as is described in U.S. Pat. No. 5,648,616 or EP-A 866 319.

In the measurement of the mass flow rate of liquids, the aforementioned proportionalities can always be assumed to be exact, so that with present-day Coriolis mass flow/density meters, a measurement accuracy of 0.1% can be guaranteed.

As the inventors have found, this exact proportionality cannot be assumed in most measurements of gaseous or vaporous fluids, which results in reduced accuracy.

SUMMARY OF THE INVENTION

It is therefore an object of the invention to provide a method of measuring the mass flow rate of a gaseous or vaporous fluid on the Coriolis principle whose accuracy is comparable to that of the measurement of liquids.

To attain this object, the invention provides a method of measuring the mass flow rate of a gaseous or vaporous fluid flowing through at least one flow tube of a mass flow sensor of a Coriolis mass flow/density meter, which flow tube vibrates in operation at a frequency f predetermined by its material and dimensions but varied by the density of the fluid, said frequency being equal to or in the vicinity of the instantaneous mechanical resonance frequency of the flow tube, has attached to it a first vibration sensor, which delivers a first sensor signal, and a second vibration sensor, which delivers a second sensor signal, the first and second vibration sensors being positioned at a given distance from each other in the direction of flow, and a vibrator, and is surrounded by a support frame or a support tube or held by a support plate so as to be capable of vibrating, said method comprising the steps of forming from the first and second sensor signals a signal dependent on a phase difference between the sensor signals, and multiplying said signal by a function f(c) dependent on the speed of sound c in the fluid.

In a first embodiment of the invention, the signal dependent on the phase difference represents a time difference between zero crossings of the sensor signals.

In a second embodiment of the invention, the signal dependent on the phase difference represents an angle difference, and the latter is divided by $2\pi$ times the vibration frequency f.

In a third embodiment of the invention, which is also applicable to the first or second embodiment, the function f(c) has the form $$f(c) = \{1 + b \cdot (2\pi \cdot f \cdot d/c)^2\}^{-1}$$

where b is a constant determined by calibration and identical for all nominal diameters of the flow tube, and d is its internal diameter.

In a further embodiment of the invention, the speed of sound c is approximated by a function $f(T_m)$ dependent on the current temperature $T_m$ of the flow tube, particularly by a function of the form: $c = c_0 + c_1 \cdot Tm$, where $c_0$, $c_1$ are fluid-specific constants.

One advantage of the invention is that the speed of sound in the fluid, and thus indirectly the compressibility of the fluid, can be taken into account in the measurement, so that the accuracy of the mass flow measurement of gaseous or vaporous fluids can be made virtually identical to that of the measurement of liquids.

BRIEF DESCRIPTION OF THE DRAWINGS

The invention and further advantages will become more apparent from the following description of embodiments when taken in conjunction with the accompanying drawings, in which.

DETAILED DESCRIPTION OF EXEMPLARY EMBODIMENTS

Figure 1:
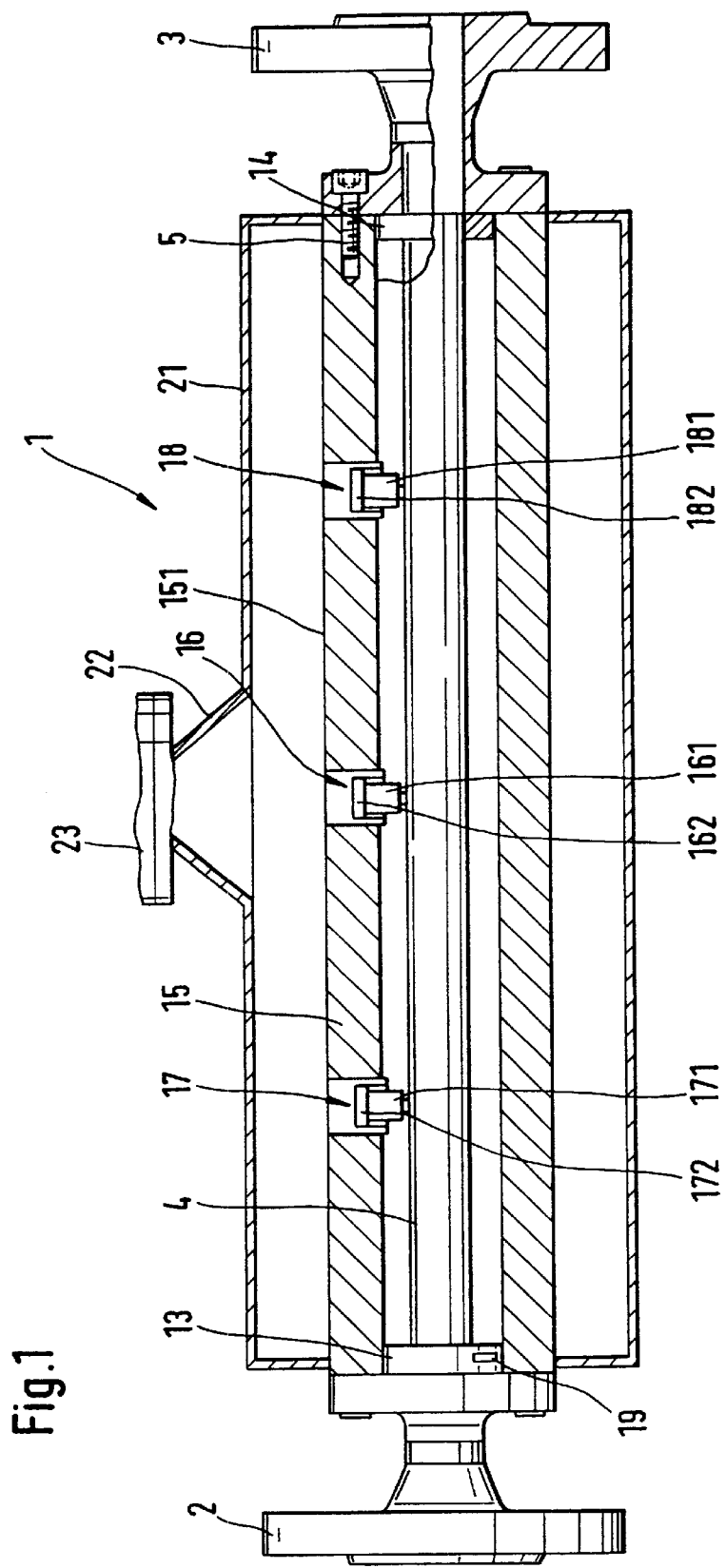
FIG. 1 is an elevational, partially sectioned view of a mass flow sensor of a mass flow/density meter with one flow tube.

While the invention is susceptible to various modifications and alternative forms, exemplary embodiments have been shown by way of an example in the drawings and will be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring to FIG. 1, there is shown an elevational, partially sectioned view of a mass flow sensor 1 of a Coriolis mass flow/density meter suitable for carrying out the method of the invention, which can be installed, e.g. by flanges 2, 3, in a pipe of a given diameter (not shown in order to simplify the illustration) through which flows a gaseous or vaporous fluid to be measured. Instead of flanges, other known means, such as Triclamp or screw connections, may be provided for connecting the mass flow sensor 1 to the pipe.

The mass flow sensor 1 of FIG. 1 has a single straight flow tube 4, whose fluid-inlet-side end is fixed to the flange 2, e.g. via a fluid-inlet-side end plate 13, and whose fluid-outlet-side end is fixed to the flange 3, e.g. via a fluid-outlet-side end plate 14. The flow tube 4 is fitted in the end plates 13, 14 in a tight manner, particularly vacuum-tight, e.g. by welding, soldering, or rolling in, see U.S. Pat. No. 5,610,342.

The method of the invention can also be used in a clamp-on Coriolis mass flow sensor according to the prior U.S. patent application Ser. No. 09/283,401, filed on Apr. 1, 1999, or in a mass flow sensor with a single flow tube having a cantilever as disclosed in U.S. Pat. No. 6,006,609 corresponding to EP-A 849 568. Instead of a single straight flow tube, the mass flow sensor of the Coriolis mass flow/density meter may have a single flow tube bent in one plane, such as a circular-sector-shaped flow tube, as is described, for example, in U.S. Pat. No. 5,705,754.

Two or more, particularly two, straight flow tubes as described in U.S. Pat. No. 4,793,191 or two or more, particularly two, bent flow tubes as described in U.S. Pat. No. 4,127,028 are also possible.

Furthermore, the method of the invention can be used in a mass flow sensor with one flow tube and one dummy tube as is described in U.S. Pat. No. 5,531,126. Finally, the method of the invention is also applicable to mass flow/density meters whose mass flow sensors have at least one helical flow tube as disclosed in U.S. Pat. No. 5,557,973 or U.S. Pat. No. 5,675,093.

In FIG. 1, the flanges 2, 3 and the end plates 13, 14 are fastened to a support tube 15 by fasteners 5 (e.g. screws) only one of which is depicted. The end plates 13, 14 may be welded or soldered to the internal wall of the support tube 15 in a tight manner, particularly vacuum-tight. It is also possible, however, to form support tube 15 and end plates 13, 14 as a single piece. Instead of the support tube 15, a support frame or a support plate can be used.

As a means for exciting the flow tube 4 into vibrations, particularly into resonance vibrations, preferably into flexural resonance vibrations, a vibrator 16, e.g. an electromagnetic vibrator, is disposed midway between the flanges 2, 3 and the end plates 13, 14 as well as in the interspace between the support tube 15 and the flow tube 4. It comprises a coil 162, which is fixed to the support tube 15, and a permanent magnet 161, which is mounted on the flow tube 4 and whose motion is reciprocating within the coil.

In FIG. 1, the vibrator 16 excites the flow tube 4 into flexural vibrations in the plane of the paper, so that also with a fluid flowing through the flow tube 4, Coriolis forces are produced in this plane which cause a phase shift between inlet-side and outlet-side sections of the flow tube 4.

Furthermore, a first and a second vibration sensor 17, 18 for sensing the vibrations of the flow tube 4 are disposed in the interspace between the flow tube 4 and the support tube 15. The vibration sensor 17 is mounted between the end plate 13 and the vibrator 16, and the vibration sensor 18 is mounted between the end plate 14 and the vibrator 16; the two sensors are preferably positioned at the same distance from the vibrator 16, i.e., from the middle of the flow tube 4.

In FIG. 1, the vibration sensors 17, 18 are electromagnetic sensors each comprising a coil 172, 182, which is attached to the support tube 15, and a permanent magnet 171, 181, which is attached to the flow tube 4 and the motion of which is reciprocating within the coil. The vibration sensors 17 and 18 provide a first sensor signal $x_{17}$ and a second sensor signal $x_{18}$, respectively.

Mounted on the end plate 13 is a temperature sensor 19 that delivers a temperature signal $x_{19}$ representative of the current temperature of the flow tube 4. The temperature sensor 19 is preferably implemented with a platinum resistance element that is attached to the end plate 13 with adhesive, for example.

Also shown in FIG. 1 is a housing 21 which is fixed to the support tube 15 and serves, inter alia, to protect leads connected to the vibrator 16 and the vibration sensors 17, 18. The leads are not shown in order to simplify the illustration.

The housing 21 is provided with a necklike transition portion 22 to which an electronics housing 23 (drawn only partly) for receiving a measuring and operation circuit of the mass flow/density meter is fixed.

If the transition portion 22 and the electronics housing 23 should adversely affect the vibration behavior of the support tube 15, they may also be disposed separately from the mass flow sensor 1. In that case, the electronics and the mass flow sensor 1 are interconnected by a cable.

Figure 2:
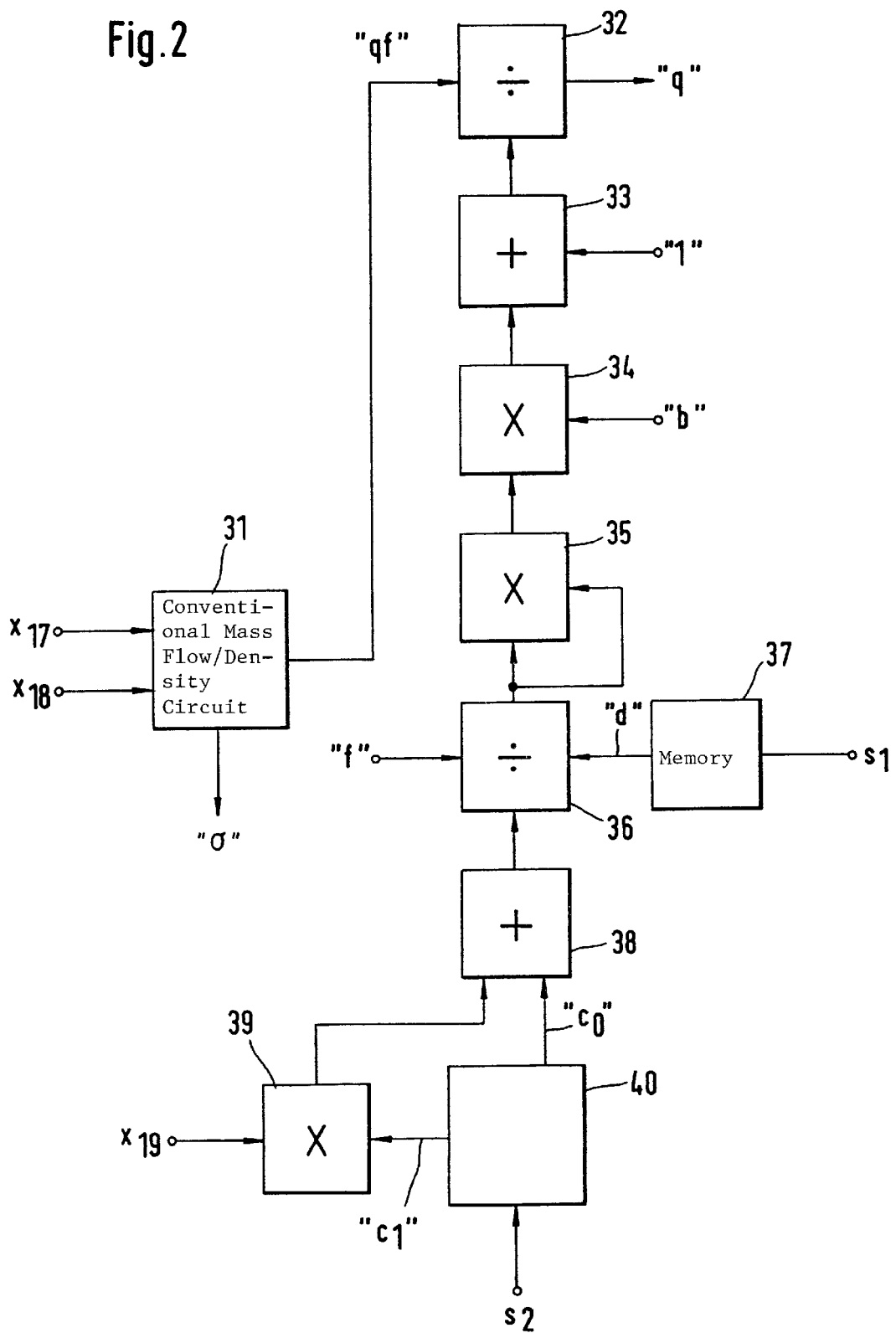
FIG. 2 is a block diagram of a measuring circuit for carrying out the method of the invention, e.g. for the mass flow meter of FIG. 1.

FIG. 2 is a block diagram of a measuring circuit for carrying out the method of the invention for mass flow/density meters employing the above-mentioned various designs of flow tubes. The measuring circuit comprises a conventional subcircuit 31 which generates a mass flow rate signal "$q_f$" and a density signal "$\sigma$" from the above-mentioned sensor signals $x_{18}, x_{19}$. For the subcircuit 31, any suitable prior-art circuit can be used, particularly the above-mentioned circuits disclosed in U.S. Pat. No. 4,187,721 or U.S. Pat. No. 5,648,616.

When liquids are passing through the flow tube 4, the mass flow rate signal "$q_f$" commonly already represents the mass flow rate q' of the liquid, i.e., the measurement result. This is due to the fact that in liquid measurements, the condition $$(2\pi \cdot f \cdot d)/c \ll 1 \tag{1}$$

is practically always satisfied,
where
    c=the speed of sound in the fluid, here in the liquid,
    d=the wall thickness of the flow tube 4, and
    f=the instantaneous vibration frequency of the flow tube 4.
Thus, for liquids, $$q_f = C \cdot \delta\tau = (C \cdot \delta\phi)/(2\pi f), \tag{2}$$

where
    C=a constant to be determined by calibration, the so-called calibration factor,
    $\delta\tau$=the above-mentioned time difference, e.g. between zero crossings of the sensor signals $x_{17}$ and $x_{18}$, and
    $\delta\phi$=the above-mentioned angle difference.

By contrast, according to the method of the invention, in the circuit arrangement of FIG. 2 the mass flow rate $q_f$ is corrected, so to speak, before a (final) mass flow rate signal "q" representing the mass flow rate q of the gaseous or vaporous fluid is generated.

The signal $q_f$ is multiplied by a function f(c) dependent on the speed of sound c in the fluid. The function f(c) can have the form $$f(c) = \{1 + b \cdot (2\pi \cdot f \cdot d/c)^2\}^{-1} \quad (3)$$

where b is a constant determined by calibration and identical for all nominal diameters of the flow tube 4, and d is its internal diameter.

In the embodiment of FIG. 2, the mass flow rate obeys the equation $$q = \frac{C \cdot \delta r}{1 + \frac{b \cdot (2\pi \cdot f \cdot d)^2}{(c_0 + c_1 \cdot x_{19})^2}} = \frac{(C \cdot \delta \phi)/(2\pi f)}{1 + \frac{b \cdot (2\pi \cdot f \cdot d)^2}{(c_0 + c_1 \cdot x_{19})^2}} \quad (4)$$

where $c_0$, $c_1$ are gas or vapor-specific constants and have the values given in the following Table, assuming that the temperature signal $x_{19}$ is proportional to temperatures measured in degrees centigrade.

| Gas | $c_0$ m/s | $c_1$ m/(s·°C.) |
|---|---|---|
| molecular oxygen | 313.32 | 0.748 |
| molecular nitrogen | 336.69 | 0.6097 |
| molecular hydrogen | 1286.6 | 2.132 |
| Air | 336.69 | 0.6097 |
| Carbon dioxide | 225.06 | 0.6983 |
| Methan | 415.72 | 0.8688 |
| Ammonia | 415.97 | 0.7037 |
| Ethylene at 7.5 MPa | 552.23 | −8.9039 |
| Ethylene at 9.5 MPa | 617.01 | −7.932 |
| Argon | 311.25 | 0.594 |
| Helium | 972.49 | 1.7011 |

The mass flow rate signal "$q_f$" from the subcircuit 31 is applied to a dividend input of a first divider 32. At an output of the latter, the mass flow rate signal "q" is provided. Connected to a divisor input of the divider 32 is an output of a first adder 33, a first input of which receives a signal "1", which represents the number 1.

A second input of the adder 33 is connected to an output of a first multiplier 34. A first input of multiplier 34 receives a signal "b", which is representative of the above-mentioned constant b. Since this constant is determined during calibration, the signal "b", as is usual for calibration values, is stored in an electronic memory, such as an EEPROM. From the latter, the signal "b" is then applied to the first input of the multiplier 34.

Coupled to a second input of the multiplier 34 is the output of a second multiplier 35, to which the same signal is applied at a first and a second input, i.e., these inputs are both connected to an output of a second divider 36. The multiplier 35 thus acts as a squaring circuit for the output signal from the divider 36. The latter has a first dividend input, to which a signal "f" representative of the instantaneous vibration frequency f of the flow tube 4 is applied. This signal can be formed from one of the sensor signals $x_{17}$, $x_{18}$ in the usual manner; see, for example, the above-mentioned U.S. Pat. No. 5,648,616.

The divider 36 has a second dividend input, to which a signal "d" representative of the wall thickness d of the flow tube 4 is applied. This signal comes from a first electronic memory 37, e.g. an EEPROM, which contains all values of the wall thickness d that occur in practice. The wall thickness d varies with the diameter of the flow tube 4, and the diameter of the flow tube varies with the nominal bore of the pipe into which the mass flow sensor is inserted. A first select signal $s_1$, with which the manufacturer of the Coriolis mass flow/density meter specifies the value of the wall thickness d for each meter, is constantly applied at a select input of the memory 37.

Finally, the divider 36 has a divisor input, which is connected to the output of a second adder 38. A first input of the second adder 38 is connected to an output of a third multiplier 39, a first input of which receives the above-mentioned temperature signal $x_{19}$ and a second input of which is connected to a first output of a second electronic memory 40. The latter may again be an EEPROM, for example.

The memory 40 holds signals "$c_0$", "$c_1$", which represent the values of the constants $c_0$, $c_1$ given in the above Table. The first output of the memory 40 delivers the signal "$c_1$", and a second output the signal "$c_0$". The second output is coupled to a second input of the adder 38. A select input of the memory 40 receives a second select signal $s_2$, with which the user of the Coriolis mass flow/density meter sets the readout of the signals "$c_0$", "$c_1$" belonging to the fluid to be measured.

If the signals fed to the subcircuits 32, 40 of FIG. 2 are digital signals, the functions of these subcircuits can be implemented with a suitably programmed microprocessor. An analog-to-digital converter must be provided between the output of the subcircuit 31 and the input of the divider 32 if the subcircuit 31 delivers an analog signal, as is the case with one of the circuits described in the above-mentioned U.S. Pat. No. 5,648,616, for example.

If the subcircuit 31 provides a digital signal, as is the case with the other of the circuits described in U.S. Pat. No. 5,648,616 or with the circuits of the above-mentioned EP-A 866 319, no analog-to-digital converter is necessary.

In FIG. 2, the speed of sound c is taken into account by using the term $c_0 + c_1 \cdot x_{19}$ for its temperature dependence. It is also possible to use other terms for the temperature dependence, such as the following Equations (5) and (6):

$$c = z_0 + z_1 \cdot T_m + z_2 \cdot p + z_3 \cdot T_m, \quad (5)$$

where $z_0$, $z_1$, $z_2$, $z_3$ = fluid-specific constants to be measured, p = the fluid pressure measured with a pressure sensor;

$$c = k_0 \cdot (T_m)^{1/2}, \quad (6)$$

where k0 is a fluid-specific constant to be measured.

If one of Equations (5), (6) is used to take account of the speed of sound c, the right-hand side of Equation (5) or (6) must be substituted for the denominator term $c_0 + c_1 \cdot x_{19}$ in Equation (4), again using the temperature signal $x_{19}$ for $T_m$.

Since each mass flow/densitity meter manufactured is to be calibrated in a very known manner during which calibration factors will be measured and stored in a memory of the meter, the above-mentioned constants can also be measured simply during this calibration.

While the invention has been illustrated and described in detail in the drawing and foregoing description, such illustration and description is to be considered as exemplary and not restrictive in character, it being understood that only exemplary embodiments have been shown and described and all changes and modifications that come within the spirit of the invention are desired to be protected.

What we claim is:

1. A coriolis-type flow meter for measuring a mass flow rate of a gaseous or vaporous fluid flowing through a pipe, said flow meter comprising:

at least one vibrating flow tube for conducting the fluid, a vibrator for vibrating said flow tube, an inlet-side first vibration sensor for generating a first sensor signal representing inlet-side vibrations of said flow tube, an outlet-side second vibration sensor for generating a second sensor signal representing outlet-side vibrations of said flow tube, and a measuring circuit for determining a speed of sound of said fluid and providing a mass flow rate signal representing the mass flow rate of said fluid, wherein said measuring circuit provides said mass flow rate signal based on said first and second sensor signals and said speed of sound of said fluid.

2. The flow meter of claim 1, further comprising a temperature sensor for generating a temperature signal that depends on a temperature of the flow tube, wherein said measuring circuit determines the speed of sound based on said temperature signal.

3. A method for measuring a mass flow rate of a gaseous or vaporous fluid flowing through a pipe by means of a coriolis-type mass flow meter, said method comprising the steps of:

vibrating a flow tube which is conducting said fluid, detecting inlet-side and outlet-side vibrations of said flow tube for generating a first sensor signal representing said inlet-side vibrations and a second sensor signal representing said outlet-side vibrations, determining a speed of sound of said fluid, and generating a mass flow rate signal representing the mass flow rate of said fluid based on both sensor signals and the speed of sound of the fluid.

4. The method of claim 3, wherein the step of determining the speed of sound comprises the step of using a digital value representing the speed of sound, and wherein said value is provided by memory means.

5. The method of claim 3, wherein the step of determining the speed of sound comprises the step of determining a temperature of the fluid.

6. The method of claim 5, wherein the step of determining the temperature of the fluid comprises the step of detecting a temperature of said flow tube and generating a temperature value representing said temperature of the flow tube.

7. The method of claim 6, wherein the step of determining the speed of sound comprises the step of calculating a function having the form $$c = c_0 + c_1 \cdot T_m$$

where $c$ is the speed of sound to be determined, $c_0$, $c_1$ are fluid-specific constants, and $T_m$ is the temperature value representing the temperature of the flow tube.

8. The method of claim 3, wherein the step of generating the mass flow rate signal comprises the step of forming a difference signal that depends on a phase difference between the two sensor signals.

9. The method as claimed in claim 8, wherein the step of generating a mass flow further comprises the step of correcting said difference signal by means of a function dependent on the speed of sound of the fluid.

10. The method as claimed in claim 9, wherein the function dependent on the speed of sound has the form $$f(c) = \{1 + b \cdot (2\pi f \cdot d/c)^2\}^{-1}$$

where $f(c)$ is a function value to be determined, $c$ is the speed of sound, $b$ is a constant depending from a nominal diameter of the flow tube, and $d$ is a constant depending from an internal diameter of the flow tube.

* * * * *